United States Patent
Astegno et al.

(10) Patent No.: US 6,193,181 B1
(45) Date of Patent: Feb. 27, 2001

(54) ELECTRICAL HOUSEHOLD APPLIANCE FOR COOKING PREPARATION, SUCH AS MULTIPURPOSE DOMESTIC ROBOT, AND MULTIPURPOSE WORKING CONTAINER

(75) Inventors: Jean-Paul Astegno, Espoey; Carole L. Tompa, Tarbes, both of (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 09/367,600

(22) PCT Filed: Feb. 18, 1998

(86) PCT No.: PCT/FR98/00311

§ 371 Date: Oct. 13, 1999

§ 102(e) Date: Oct. 13, 1999

(87) PCT Pub. No.: WO98/36670

PCT Pub. Date: Aug. 27, 1998

(30) Foreign Application Priority Data

Feb. 18, 1997 (FR) .................................................. 97 02310

(51) Int. Cl.[7] .................................................. A47J 43/044
(52) U.S. Cl. .......................................................... 241/282.1
(58) Field of Search ........................... 241/199.12, 282.1, 241/282.2; 366/279

(56) References Cited

U.S. PATENT DOCUMENTS

| 2,225,250 | * | 12/1940 | Rodwick | 241/199.12 |
| 2,940,738 | * | 6/1960 | Posener et al. | 241/282.1 |
| 3,761,026 | * | 9/1973 | Rohmer | 241/282.1 |
| 4,813,624 | | 3/1989 | Williams . | |
| 5,156,084 | | 10/1992 | Lin . | |
| 5,360,170 | | 11/1994 | Cartellone . | |

FOREIGN PATENT DOCUMENTS

| 257 732 | 3/1988 | (EP) . |
| 1 420 840 | 3/1966 | (FR) . |
| 1 447 209 | 10/1966 | (FR) . |
| 2 642 294 | 8/1990 | (FR) . |
| 2 743 710 | 7/1997 | (FR) . |
| 2 230 409 | 10/1990 | (GB) . |

* cited by examiner

Primary Examiner—Mark Rosenbaum
(74) Attorney, Agent, or Firm—Browdy and Neimark

(57) ABSTRACT

Electrical household appliance for culinary preparation of the multi-function food processor type composed of a container (1) with a bottom (16) and an opposed opening (19), as well as a rotatable working assembly (2) driven by a motor connected to the working assembly by a driving shaft (4) and on which is mounted a working implement (5) disposed substantially in proximity to the bottom of the container, the implement defining a working zone (3). The container (1) has at least one rib (6) extending along a wall (15) of the container in the working zone (3), the rotatable working assembly (2) is removable with respect to the container (1), and the rotatable working assembly (2) includes a pedestal (7) movable in rotation around the axis A–A' of the working assembly (2), which comes to bear on a relief (8) formed on the bottom of the container (1).

12 Claims, 3 Drawing Sheets

ELECTRICAL HOUSEHOLD APPLIANCE FOR COOKING PREPARATION, SUCH AS MULTIPURPOSE DOMESTIC ROBOT, AND MULTIPURPOSE WORKING CONTAINER

This application is the national phase of international application PCT/FR98/00311 filed Feb. 18, 1998 which designated the U.S.

TECHNICAL FIELD

The present invention relates to the general technical field of electrical household appliances for culinary preparation of the multi-function food processor type.

PRIOR ART

Multi-function food processors can particularly chop meat or in a more general manner solid foods, blend liquids, and even crush ice. High-performance appliances for blending liquids generally comprise a tall working container, removable from the base of the appliance, known under the name blender. Blenders can equally crush small quantities of ice. The working containers and the working implements of food processors provided for chopping meat or solid foods generally blend liquids poorly, and do not crush ice.

Because of this shortcoming, prior art appliances that are provided to chop solid foods, blend liquids and crush ice in a satisfactory manner comprise most often two working containers, one for working on solid foods, the other for working on liquids and ice.

These appliances are thus bulky. They are equally generally difficult to clean, since they comprise numerous parts and require a sometimes careful disassembly, or comprise cutting parts necessitating particular care on the part of the user. Particularly, the working implement of blenders comprises four blades and is most often movably mounted in rotation at the bottom of the working container. Cleaning of such a container being difficult, the user can be lead to neglect it, which is to the detriment of hygiene.

In addition, these appliances require most often transfer of the preparation into another container, whether this is for storage, cooking or serving. In particular, it is not possible to utilize in a microwave oven a blender comprising a metal element such as the working implement disposed at the bottom of this container. There results therefrom additional cleanings of the containers. The user has moreover need for a large work surface.

SUMMARY OF THE INVENTION

The object of the invention is to propose an electrical household appliance for culinary preparation which overcomes the above-cited drawbacks and which permits performance of the blending, mixing, chopping, ice crushing functions in the same working container, while utilizing a very reduced number of accessories.

Another object of the invention aims to propose an electrical household appliance for culinary preparation offering a great ease of utilization and of cleaning.

Another object of the invention aims to propose an electrical household appliance for culinary preparation permitting to store, cook or serve the preparation produced, without having to transfer it into another container.

Another object of the invention aims to propose a multi-use working container.

The objects assigned to the invention are achieved with an electrical household appliance for culinary preparation of the multi-function food processor type, comprising a working container with a bottom and an opposed opening, as well as a rotating working assembly driven by a motor means connected to said working assembly driven by a motor means connected to said working assembly by a driving shaft and on which is mounted a working implement disposed substantially in proximity to the bottom of said container, said implement thus defining a working zone, characterized in that the container comprises at least one rib extending along a wall of said container in the working zone, and in that the rotatable working assembly is removable with respect to the working container, and in that the rotatable working assembly comprises a pedestal movable in rotation around the axis of the working assembly, which comes to bear on a relief formed on the bottom of the container.

A priori, the ribs create whirlpools within the preparation, noticeably increasing with the consistency of the foods treated. The presence of ribs was essentially envisionable for appliances capable of treating liquids or products of soft consistency. However, due to the pedestal which is movable in rotation around the axis of the working assembly, coming to bear on a relief formed on the bottom of the container, the working assembly is firmly maintained on its axis of rotation. The production of optimal chopped preparations can be effectuated without risk of displacement of the working assembly from its axis of rotation.

The presence of one or several ribs always permits as previously optimal blending of liquid preparations by aiding the appearance of whirlpools within the liquid. The user benefits also from a container and a working assembly very easy to clean, the rotatable working assembly being removable with respect to the working container. In addition, the user can use a microwave oven to reheat or cook his preparation, the working container not including metal parts such as an insert or a working implement.

Thus, it is possible with the appliance according to the invention to realize in the same working container, with the same implement or the same type of implement, two types of preparations normally achieved in two different containers with two different implements. There results therefrom a simplification of the use of the appliance, since a single working container is utilized.

Advantageously, the rib or ribs are extended along the wall of the container in the working zone with a variable thickness, for example decreasing in the direction of the base of the container.

The variable thickness of this rib or these ribs in the working zone of the implement permits agglomeration of the meat or other foods against the walls to be avoided during chopping.

In an advantageous manner, the appliance according to the invention comprises a lid coming in at least partial annular contact with the container and comprising an orifice provided for the passage of the shaft for driving the working assembly.

Thus, there is no risk of the preparation spilling out of the working container, and the user can obtain crushed ice without fearing that the preparation will escape the working container via the lid.

According to an advantageous version of the invention, the working container is of a vitroceramic.

Thus, the user can chop or mix foods to be prepared in the working container, then place the container containing the prepared foods in a microwave oven or on a cooking surface in a manner to heat them or cook them, or even store in the refrigerator or the freezer the container containing the rest of the preparation when this has not been entirely used. Due to the very small coefficient of thermal expansion of vitroceranics giving them a good resistance to thermal shocks, the user can place the container in an oven or on a cooking surface upon removal from the refrigerator or the freezer, without any particular waiting period.

Advantageously, the working implement comprises 2 blades.

The working implement mounted on the working assembly is thus very simple to clean, and in addition very economical to fabricate.

In an advantageous manner the working container is provided to cooperate with a lid, in a manner to constitute a sealed container.

Storage of the preparations, particularly in the refrigerator, is thus facilitated.

BRIEF DESCRIPTION OF THE DRAWINGS

Other particularities and advantages will appear more clearly from the reading of the description given here below in reference to the attached drawings given by way of illustrative but non-limiting examples in which.

BEST MANNER OF ACHIEVING THE INVENTION

Figure 1:
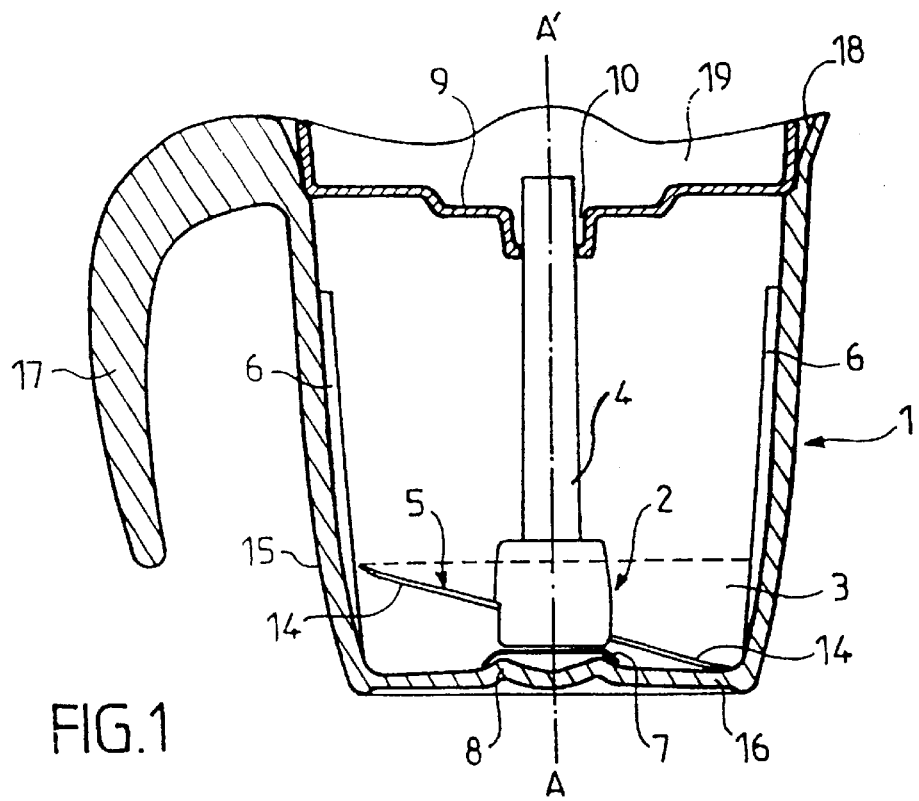
FIG. 1 shows according to a partial longitudinal cross-section an example of an embodiment of an electrical household appliance for culinary preparation according to the invention.

The electrical household appliance for culinary preparation according to the invention shown in FIG. 1 comprises a working container 1, of any appropriate form, for example substantially cylindrical, delimited externally by lateral walls 15 and a bottom 16, and comprising an opening 19 opposite to the bottom 16. Such as shown particularly in FIGS. 1 and 2, container 1 advantageously comprises a handle 17 and a pouring lip 18.

Container 1 is made of any material compatible with food use, and in an advantageous manner, of any material permitting its utilization on a cooking surface, such as a vitroceramic material, or in an oven, such as glass or a ceramic material, and in particular vitroceramic, or even in a microwave oven, a refrigerator or a freezer, such as a polymer material, glass or a ceramic material. Vitroceramics, due to their small coefficient of thermal expansion giving them a very good resistance to thermal shocks permit the utilization of container 1 in an oven or on a cooking surface, as soon as it is taken out of the refrigerator or the freezer, without any particular wait. There results therefrom a simplification and an appreciable time saving for the user.

The appliance equally comprises a rotatable working assembly 2, driven by a motor means, not shown in the figures, by the intermediary of a driving shaft 4 advantageously removable. On the working assembly 2 is mounted a working implement 5, comprising in an advantageous manner, two blades 14. Working tool 5 mounted on working assembly 2 is disposed substantially in proximity to bottom 16 of container 1 and defines a working zone 3 extending between walls 15. In the embodiment shown in FIG. 1, the two blades 14 are disposed in a plane whose normal is inclined with respect to the axis of rotation A–A' of working assembly 2.

Working container 1 of the appliance according to the invention comprises along the wall 15 at least one interior rib 6, advantageously having a substantially axial direction. The presence of one or several ribs 6 permits optimal mixing of liquid preparations by aiding the appearance of whirlpools within the liquid. At least one of the ribs 6, and advantageously each of ribs 6 is extended along wall 15 of container 1 in working zone 3 with a variable thickness. This arrangement permits blending of the liquid preparations correctly, and also permits chopping foods such as meat while avoiding agglomeration thereof against the walls of container 1.

Advantageously, container 1 comprises four ribs 6. In the exemplary embodiment shown in FIG. 1, the thickness of each rib 6 diminishes progressively in working zone 3 in the direction of bottom 16 of container 1.

In an advantageous manner, rotatable working assembly 2 is removable with respect to working container 1. Bottom 16 of container 1 advantageously comprises a relief 8 on which comes to bear a pedestal 7 mounted to be movable in rotation around axis A–A' of working assembly 2, such as shown in FIG. 1. The user can thus easily clean container 1 and working assembly 2. This arrangement equally permits placing container 1 in a microwave oven in order to heat or cook its contents.

Figure 2:
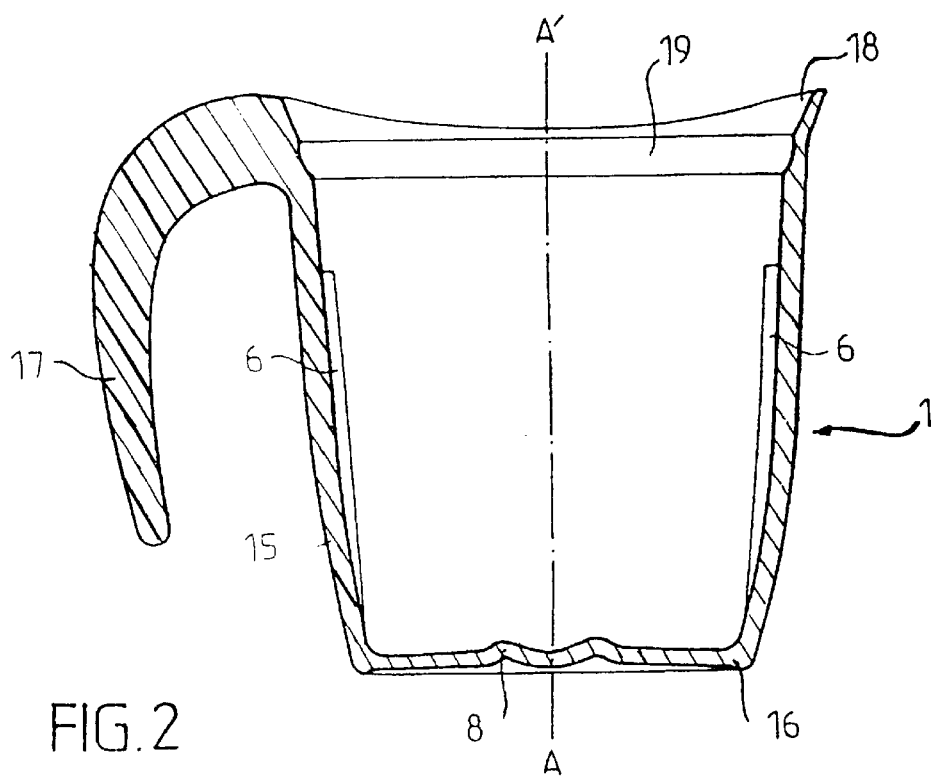
FIG. 2 shows according to a longitudinal cross-section an example of an embodiment of a working container of an electrical household appliance for culinary preparation according to the invention.

Relief 8 represented in FIGS. 1 and 2 is present in the form of a circular ring, more particularly notable in that its external face is substantially conical with an apex angle comprised between 60 and 120°, for example 90°. Pedestal 7 presents, correspondingly, a conical interior face. In other words, seen in transverse cross-section, the exterior face of the relief forms an angle comprised between 30° and 60° with respect to the horizontal.

This form of embodiment is found to be relatively easy to fabricate for containers 1 of glass or of vitroceramic. In addition, pedestal 7 of working assembly 2 comes to position itself on relief 8, which is particularly advantageous when the user is no longer able to see the bottom of the container. Tests have shown that this manner of attachment has proven sufficient with standard ribs such as shown, i.e. the height of which with respect to wall 15 is comprised between 5 and 10% of the radius of container 1.

As shown in FIG. 1, the appliance according to the invention equally comprises a lid 9 coming in at least partial annular contact with container 1. Lid 9 comprises an opening to provided for the passage of shaft 4 driving working assembly 5. This arrangement permits avoiding discharges out of container 1 during utilization of the appliance. The rib or ribs 6 are interrupted at a distance from opening 19 of container 1, and in an advantageous manner at a distance from lid 9 when this latter is in place in container 1, for the purpose of helping the preparation within the container to redescend. This arrangement permits avoidance of the presence of a seal provided to contain overflowing of the preparation as it moves upwardly along the wall. Biofilms are an effect susceptible to being formed on such seals and the user often does not pay sufficient attention to their cleaning.

Figure 3:
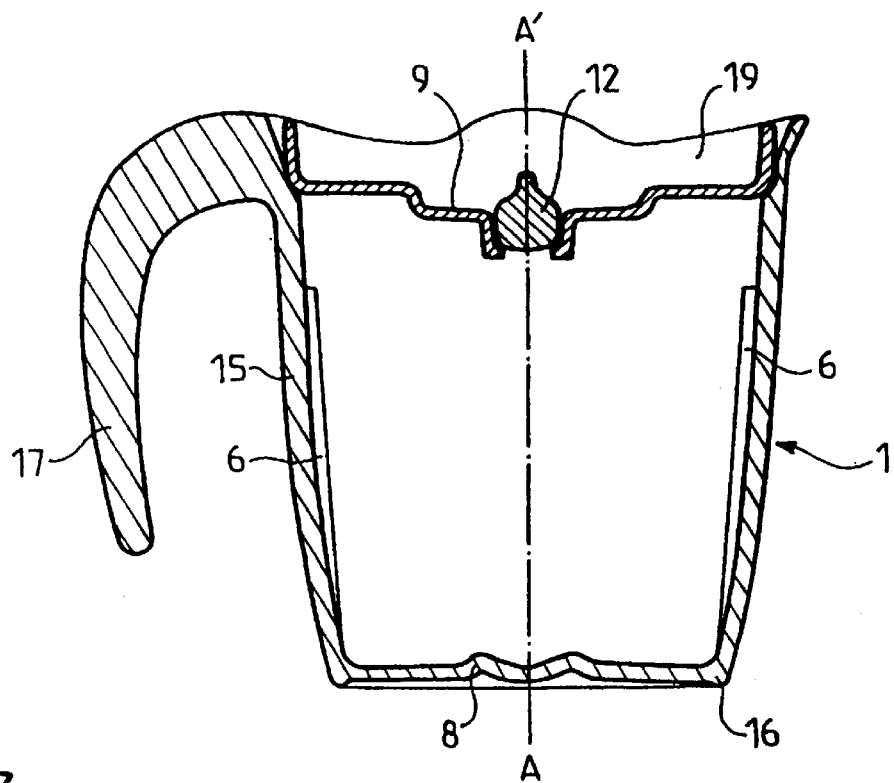
FIG. 3 shows according to a longitudinal cross-section a first example of utilization of the working container of an electrical household appliance for culinary preparation conforming to the invention for storage of the preparation.
Figure 4:
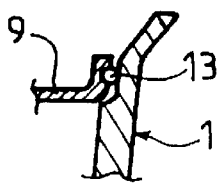
FIG. 4 shows according to a partial longitudinal cross-section a detail of a variant embodiment of the embodiment example of FIG. 3.

FIG. 3 shows an advantageous arrangement of the present invention, in which lid 9 is provided to cooperate with closing means 12 for opening 10, this in order to facilitate storage of the preparation. FIG. 4 shows a variation of the preceding arrangement, in which lid 9 comprises a seal 13 provided to guarantee good storage of the preparations.

Figure 5:
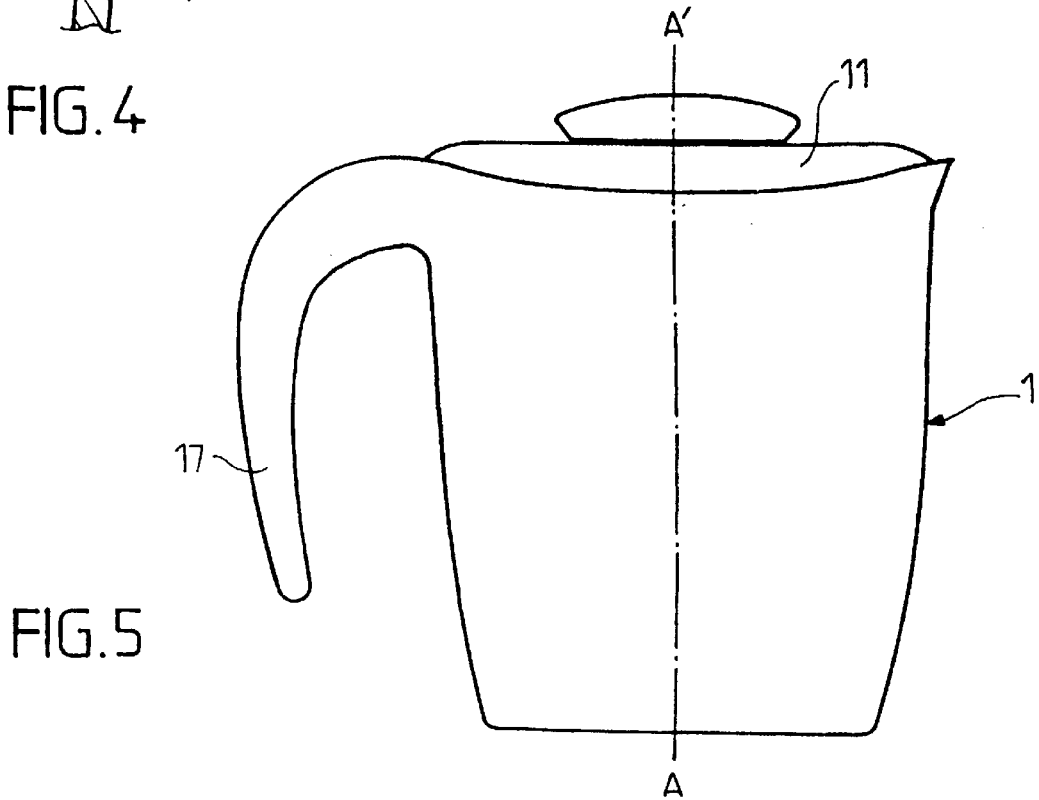
FIG. 5 shows according to a side view a second example of utilization of the working container of an electrical household appliance for culinary preparation according to the invention for storing the preparation.

FIG. 5 presents another advantageous arrangement of the present invention, equally permitting the aiding of good storage of the preparations, in which the working container cooperates with a lid 11.

Figure 6:
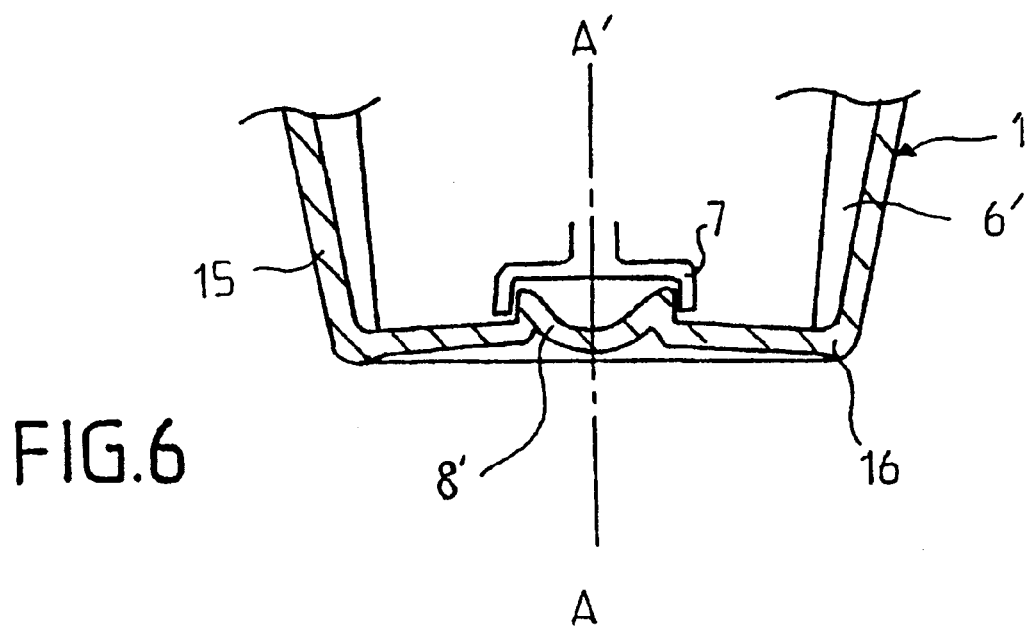
FIG. 6 shows according to a partial longitudinal cross-section another exemplary embodiment of the working container of an electrical household appliance for culinary preparation according to the invention.

FIG. 6 presents a portion of the bottom of container 1 and shows a variant 8' of the relief of which the external face is substantially circularly cylindrical, i.e. the exterior wall of relief 8' is practically perpendicular to the bottom of container 1. For considerations of fabrication of container 1 made of glass or of vitroceramic, the upper edge of relief 8' is rounded. On the other hand, the interior face of rotatable pedestal 7 coming in correspondence is equally substantially cylindrical. This embodiment lends itself particularly well to a container 1 comprising a large number of ribs, for example at least 4 and more, or to ribs 6' which are more pronounced, of which the height with respect to wall 15 is for example comprised between 7 and 20% of the radius of container 1, such as shown in FIG. 6.

The appliance according to the preferred form of the invention is utilized in the following manner.

The user arranges rotatable working assembly 2 at the bottom of working container 1, adjoining driving shaft 4, and on which is mounted working implement 5. He can then introduce into the container the ingredients of his preparation and proceed with the desired work after having arranged lid 9 and the motor block on container 1.

One advantage provided by the present invention is the utilization of a same multi-use working container 1 to prepare chopped products, liquid mixtures and crushed ice. It is possible to utilize the same type of implement 5 for different preparations but preferably the user will chose an implement 5 with blunt blades for crushing ice.

When the preparation is ready, the user can utilize it in a known manner, but also cook it in arranging container 1 of vitroceramic material, from which will have been removed the other elements of the appliance, on a cooking surface, or store it in the refrigerator or the freezer by utilizing lid 11 or lid 9 and closing means 12.

The present invention concerning an appliance and a working container 1 permitting preparation of chopped products, blended liquids and crushed ice is not in any way limited to the examples set forth above by way of illustration, but can present other embodiments, not shown in the figures. In particular, the rib or ribs can be of any appropriate form. The exterior face of the relief can form an angle greater than 60° with respect to the horizontal. The relief can have a form, seen from above, other than circular, for example polygonal or in the form of a star.

POSSIBILITIES OF INDUSTRIAL APPLICATION

The invention finds its application in the field of electrical household appliances.

What is claimed is:

1. Electrical household appliance for culinary preparation of the multi-function food processor type comprising a container (1) with a bottom (16) and an opposed opening (19), as well as a rotatable working assembly (2) driven by a motor means connected to said working assembly by a driving shaft (4) and on which is mounted a working implement (5) disposed substantially in proximity to the bottom of said container, said implement defining a working zone (3), characterized in that the container (1) comprises at least one rib (6) extending along a wall (15) of said container in the working zone (3), in that the rotatable working assembly (2) is removable with respect to the container (1), and in that the rotatable working assembly (2) comprises a pedestal (7) movable in rotation around the axis A–A' of the working assembly (2), which comes to bear on a relief (8) formed on the bottom of the container (1).

2. Appliance according to claim 1, characterized in that the rib or ribs (6) are extended along the wall (15) of the container (1) in the working zone (3) with a variable thickness.

3. Appliance according to claims 1, characterized in that the thickness of the rib or ribs (6) decreases progressively in the working zone (3) in the direction of the bottom (16) of the container (1).

4. Appliance according to claims 1, characterized in that it comprises a lid (9) coming into at least partial annular contact with the container (1) and comprising an opening (10) provided for the passage of the shaft (4) driving the working assembly (2).

5. Appliance according to claims 1, characterized in that the rib or ribs (6) are interrupted at a distance from the opening (19) of the container (1).

6. Appliance according to claims 1, characterized in that the container (1) is of glass.

7. Appliance according to claims 1, characterized in that the container (1) is of vitroceramic.

8. Appliance according to claims 1, characterized in that the working implement (5) comprises 2 blades (14).

9. Appliance according to claim 8, characterized in that the working implement (5) is inscribed in a plane whose normal is inclined with respect to the axis of rotation A-A' of the working assembly (2).

10. Appliance according to claims 1, characterized in that the working container is provided to cooperate with a lid (11).

11. Appliance according to claims 1, characterized in that the lid (9) is provided to cooperate with closing means (12) of the opening (10).

12. Appliance according to claim 11, characterized in that the lid (9) comprises a seal (13).

* * * * *

UNITED STATES PATENT AND TRADEMARK OFFICE
CERTIFICATE OF CORRECTION

PATENT NO. : 6,193,181 B1
DATED : February 27, 2001
INVENTOR(S) : Jean-Paul Astegno; Carole L. Tompa It is certified that error appears in the above-identified patent and that said Letters Patent is hereby corrected as shown below:

Column 6,
Line 65, change "to provided" to read -- 10 provided --

Signed and Sealed this

Thirteenth Day of November, 2001

*Attest:*

*Nicholas P. Godici*

*Attesting Officer*

NICHOLAS P. GODICI
*Acting Director of the United States Patent and Trademark Office*